United States Patent Office 3,490,979
Patented Jan. 20, 1970

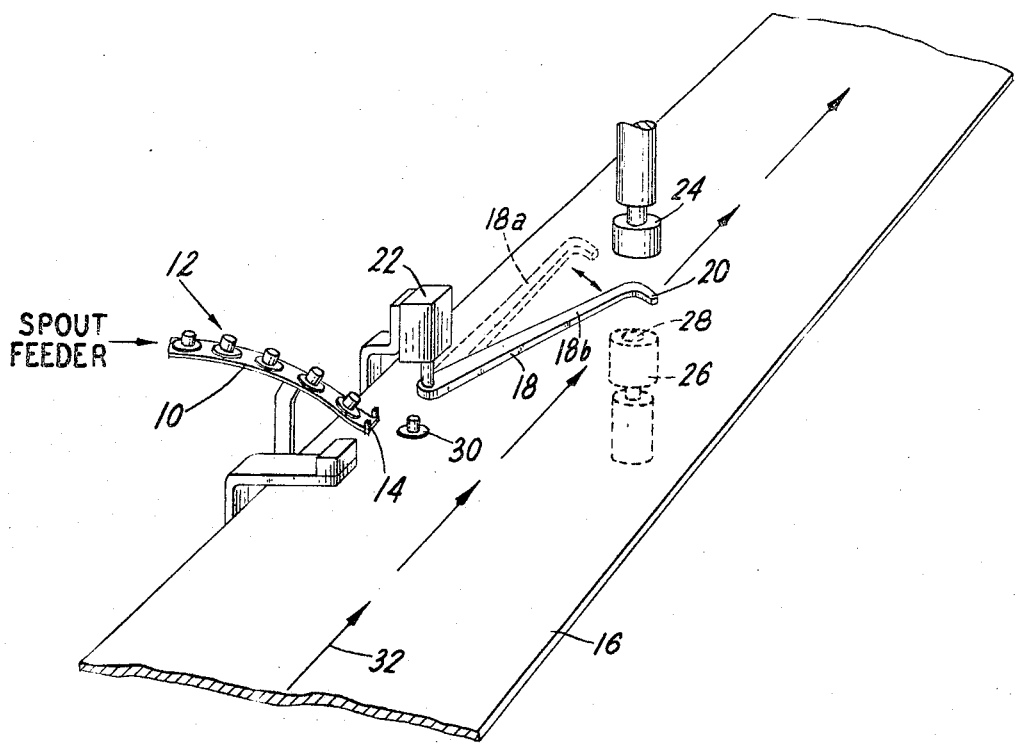

3,490,979
APPARATUS FOR ATTACHING SPOUTS TO A WEB
William L. Calvert, Westfield, N.J., and Harry Craig, Jr., Cartersville, Ga., assignors to Union Carbide Corporation, a corporation of New York
Filed Apr. 21, 1966, Ser. No. 544,176
Int. Cl. B32b 31/10; C09j 5/10
U.S. Cl. 156—366                                     9 Claims

ABSTRACT OF THE DISCLOSURE

An apparatus for attaching spouts to a web having a chute with an electrically timed gate mechanism; a guiding rail pivotally mounted at one end to the electrical timing device at one end, and the other end adapted to receive the neck of spout in a nestled fashion; and a back-up die and heated sealing die for attaching the spout to the web.

---

This invention relates to an apparatus for attaching spouts to a web and a method in connection therewith and more particularly to a method and apparatus for attaching spouts to a web wherein the web itself transfers the spout to the attaching position on the web.

Several methods are currently in use for the manufacture of spouted film bags which serve as liners in cartons for milk and other flowable materials. It is important in all these methods that there be accuracy of alignment of the spout with the sealing die and back-up ring, minimization of cycle time required for the operation, simplicity and economy of equipment and, above all, reliability. However, such present day methods are deficient in one or more of the above requirements. One typical method transfers spouts one at a time through a gate mechanism, down a gravity feed chute to sockets in a four-position turret. The turret indexes 90 degrees per machine cycle to bring a new spout into position for sealing. However, spout seal quality is extremely sensitive to alignment, flatness, and consistency of the back-up surface. Furthermore, since each turret station carries its own back-up ring, and since alignment is dependent upon the accuracy of turret indexing, the number of variables affecting seal quality is greatly multiplied. A four station machine develops sixteen different sets of sealing conditions. Also, transfer of spouts from feed chute to turret socket by gravity is unreliable, particularly when spouts have warped flanges or other defects. The necessary loose fit of the spout in the socket precludes accurate centering of the spout with respect to the sealing die. A still further shortcoming of such a system is that the table supporting one web is required to be vertically movable so that the sealed-on spout can be dropped out of the turret socket to permit advance of the web. Such a requirement adds both mechanical and control circuitry complexity. Summarily, heretofore known methods are limited in that either the spout transfer operation adds unwanted time to the machine cycle, or an intermediate transfer element such as a turret, tray, and the like has been incorporated to hold a spout at the ready position, from which it can be transferred to the sealing position in a time not exceeding that required to index the web.

Accordingly, it is an object of this invention to provide a method and apparatus for making spouted film bags which avoid the aforementioned difficulties and shortcomings.

The present invention provides a method and apparatus for depositing a spout on a film web, transferring the spout to the sealing position on the web, sealing the spout to the web, and then repeating the whole cycle. In the method of the invention, as will be explained, the film web itself is used to transfer the spout to the sealing position on the web. In accordance with the method, a web of material is supported in an intermittently translatable manner and a spout is intermittently deposited in an up-right position on the web. Thereupon, the web is advanced and simultaneously therewith the spout is guided to the attaching position of the web whereby the spout is allowed to rest coaxial with the attaching means. Finally, the spout is attached to the web.

A further aspect of the present invention includes an apparatus for attaching spouts to a web of material. The apparatus of the invention comprises an indexed web, means for intermittently depositing the spout in an up-right position on the web, means for laterally translating the spout upon depositing the spout on the web, means for guiding the spout to the attaching position on the web upon translating the spout, and means for attaching the spout to the web.

In the drawing, there is shown an isometric view partly in section of an apparatus embodying the invention showing a plurality of flanged spouts and a web of material in position.

Referring now to the drawing, the apparatus of the invention includes a chute 10 having a plurality of spouts 12 thereon in single file and right side up. The spouts can be sent down the chute 10 by a commercial spout feeder such as a vibratory bowl feeder. A gate mechanism 14 which is controlled by a commercially available electrical timing device is situated at the lower-most end of the chute. The apparatus also includes a web of material 16 supported thereon and a pivot-mounted guide rail 18. The pivot-mounted guide rail 18 has a protruding stop 20 affixed to its free end can be moved into either an outer 18a or inner position 18b by a commercial electrically controlled actuator 22. Located about midpoint of the web 16 is a sealing station or the spout attaching position of the web. Specifically, the sealing station includes a back-up die 24 above the web 16 and a heated sealing die 26 beneath the web 16. The die 26 can have a knife 28 located in the center of the die if one so desires in order to cut the web and provide a common opening with the internal chamber of the spout 12.

When the apparatus is in operation, a spout 12 is fed down the chute 10 to a location 30 which is a few inches upstream from the sealing station 24, 28 and just off to the side of the path of spout travel 32. The gate mechanism 14 permits a spout to be deposited on the web at the proper time. With the guide rail 18 in its retracted outer position 18a, the web 16 begins to move forward. The spout 12, due to the continued movement of the web, passes away from the gate 14 towards the guide rail 18 which has now assumed its inner position 18b. Continued movement of the web 16 causes the spout to slide along the edge of the guide rail 18 until its motion is arrested by the stop 20 at the end of the rail 18. The inner position 18b of the guide rail 18 is such that a spout nestled against the stop 20 will occupy a position exactly coaxial with the back-up die 24 and the heated sealing die 26. With the spout held motionless in sealing position by the stop 20, the web completes its stroke and comes to rest. The guide rail 18 then returns to its outer position 18b leaving the spout in sealing position as the back-up die 24 descends from above and the sealing die 26 rises beneath the web 16. After the seal is completed, the dies 24, 26 retract and the whole cycle repeats.

A unique feature of the present invention is the employment of the web itself as a "transfer turret" in combination with a hook-ended guide rail to guide the spout into exact sealing position during the indexing of the web. The advantages of such a system over present day systems are extreme simplicity, inherent synchronization with the apparatus cycle, and great versatility with respect to the shape of spout, capped or uncapped, which can be handled. Placement of a spout on the web is completely uncritical with regard to both time and position. The spout can be placed on the web at any time while the web is not moving. For position, it need only be laterally within range of the guide rail and longitudinally close enough to be carried into sealing position by the indexing motion of the web.

In the preferred form described, the sealing location is stationary, and the web moves with an intermittent motion. It is essential only that the proper relative motions be preserved. For example, the web motion might well be continuous while the sealing station (with guide rail, etc.) reciprocate to produce periods of relative motion and dwell. Or the period dwell might be eliminated altogether in cases where the attaching operation was virtually instantaneous as, for instance, by a hammer blow.

It is to be noted that all of the time-saving advantages of a transfer turret are realized without, in fact, having any such device at all. It is also to be noted that this spout transfer system allows the heat sealing equipment to consist of one heat die below the web opposed by one back-up element above the web, both coaxial and well guided, and avoids any necessity for a multiplicity of turret mounted back-up rings. Significant improvements in economy, efficiency and reliability are immediately realized. For example, there is a reduction in total number of working parts and a drastic reduction in parts requiring precision adjustment, resulting in lower maintenance costs, less frequent repairs and adjustments and increased operating efficiency.

Instead of one guide rail there can be two converging guide rails to guide the spout into position from either the right or the left of the web. The angle of the rail(s) with respect to web motion can vary from zero to 90 degrees, depending upon the amount of longitudinal and lateral translation required by the spout and the length of web stroke available to produce this translation.

The proposed apparatus can be used for securing any thermoplastic spout to any thermoplastic film or web. While polyethylene is a preferred material, similarly other polyolefins including polyethylene copolymers, polypropylene, copolymers of ethylene and propylene, and laminates of such polyolefins can be used also. The securing of rubber spouts to rubber sheets or metal spouts to metal sheets and combinations thereof, are other possibilities. Furthermore, adhesives may be used in place of heat sealing for attachment of the spout to film when permitted by the materials of construction and the application.

The apparatus of the invention is especially suitable for manufacturing spouted bags. However, the apparatus can also be used to manufacture other products where attachment mechanisms of parts is desired, such as in toys household and automobile accessories and the like.

What is claimed is:
1. Apparatus for attaching spouts to a web which comprises:
   (a) a chute having an electrically timed gate mechanism at the end thereof for intermittently depositing said spout in an upright position on said web;
   (b) means for laterally translating said spout upon depositing the spout on the web;
   (c) means for guiding said spout to the attaching position on the web upon translating said spout, and
   (d) means for attaching said spout to said web.

2. Apparatus of claim 1 wherein said means for laterally translating said spout upon depositing the spout on the web comprises an intermittently moving web.

3. Apparatus of claim 1 wherein said means for guiding said spout to the attaching position on the web upon translating the spout comprises a guide rail having one end pivotally mounted to actuating means and the other end adapted to receive the neck of the spout in nestled fashion whereby the spout will lie coaxially with the attaching means.

4. Apparatus of claim 1 wherein said means for attaching said spout to said web comprises a back-up die above the web and a heated sealing die beneath the web coaxial with the back-up die.

5. Apparatus of claim 3 wherein said actuating means comprises an actuator adapted to move the guiding rail in at least two positions parallel to said web.

6. Apparatus of claim 5 wherein the angle of the guiding rail with respect to the web motion varies from about zero to 90 degrees.

7. Apparatus for attaching spouts to a web which comprises:
   (a) a chute having an electrically timed gate mechanism at the end thereof thereby permitting the spout to be deposited on the web at the proper time;
   (b) a guiding rail having one end pivotally mounted to actuating means and the other end adapted to receive the neck of the spout in nestled fashion whereby the spout will lie coaxially with the attaching means;
   (c) means for intermittently moving said web for translating said spout upon being deposited thereon adapted to cause the neck of said spout to contact said guiding rail and translate along the edge thereof, and
   (d) a back-up die above the web and a heated sealing die beneath the web coaxial with the back-up die for attaching said spout to said web.

8. Apparatus of claim 7 wherein said actuating means comprises an electrical timing device adapted to move the guiding rail in at least two positions parallel to said web.

9. Apparatus of claim 7 wherein the angle of the guiding rail with respect to the web motion varies from about zero to 90 degrees.

References Cited
UNITED STATES PATENTS

| | | | |
|---|---|---|---|
| 3,425,887 | 2/1969 | Bowen | 156—518 |
| 3,005,898 | 10/1961 | Rosenthal | 156—366 |
| 3,299,251 | 1/1967 | Zilnick | 156—366 X |
| 3,244,576 | 4/1966 | Swartz | 156—583 X |
| 3,366,523 | 1/1968 | Weber | 156—274 X |
| 3,355,340 | 11/1967 | Calvert et al. | 156—261 X |

HAROLD ANSHER, Primary Examiner

U.S. Cl. X.R.

156— 293, 303.1, 306, 423, 514, 552, 583